(12) United States Patent
Kim et al.

(10) Patent No.: US 11,761,927 B2
(45) Date of Patent: Sep. 19, 2023

(54) INSPECTION METHOD FOR CRACK IN BATTERY CELL BY USING EDDY CURRENT, AND INSPECTION DEVICE (71) Applicant: LG CHEM, LTD., Seoul (KR)

(72) Inventors: Seok Jin Kim, Daejeon (KR); Sang Hyun Koo, Daejeon (KR); Cha Hun Ku, Daejeon (KR); Jung Hoon Lee, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 323 days.

(21) Appl. No.: 17/276,449

(22) PCT Filed: Mar. 25, 2020

(86) PCT No.: PCT/KR2020/004036
§ 371 (c)(1),
(2) Date: Mar. 15, 2021

(87) PCT Pub. No.: WO2020/213846
PCT Pub. Date: Oct. 22, 2020

(65) Prior Publication Data
US 2022/0034843 A1 Feb. 3, 2022

(30) Foreign Application Priority Data

Apr. 17, 2019 (KR) .................. 10-2019-0044954

(51) Int. Cl.
*G01N 27/9013* (2021.01)
*G01N 27/90* (2021.01)
*G01V 8/10* (2006.01)

(52) U.S. Cl.
CPC ..... *G01N 27/9026* (2013.01); *G01N 27/9006* (2013.01); *G01N 27/9046* (2013.01); *G01V 8/10* (2013.01)

(58) Field of Classification Search
CPC .. G01V 8/10; G01N 27/9026; G01N 27/9006; G01N 27/9046; G01N 27/90;
(Continued)

(56) References Cited

U.S. PATENT DOCUMENTS 2,979,196 A * 4/1961 Harmon ............ G01N 27/9093
324/237
2007/0285088 A1 12/2007 Meilland
(Continued)

FOREIGN PATENT DOCUMENTS

CN 101040182 A 9/2007
CN 105765758 A 7/2016
(Continued)

OTHER PUBLICATIONS

Sharp et al.; "Lithium-ion battery electrode inspection using pulse thermography"; Pub. Date Mar. 12, 2014; NDT&E International; vol. 64; pp. 41-51 (Year: 2014).*
(Continued)

*Primary Examiner* — Alesa Allgood
*Assistant Examiner* — Rahul Maini
(74) *Attorney, Agent, or Firm* — Morgan, Lewis & Bockius LLP (57) ABSTRACT

A device for detecting a crack in a battery cell, comprising: an inspection unit comprising a first sensor inducing an eddy current and a second sensor sensing a signal of the eddy current induced by the first sensor, and performing an inspection of the battery by using the eddy current while the battery cell is driven; a transfer unit for sequentially transferring a plurality of battery cells from a point where the battery cells are introduced to a point where the battery cells are taken out; and a control unit which is electrically (Continued)

connected to the inspection unit and receives, evaluates, and controls the eddy current signal sensed by the inspection unit.

13 Claims, 6 Drawing Sheets

(58) Field of Classification Search
CPC ............. G01N 27/9073; G01N 27/908; G01N 27/9093; H01M 10/4285; H01M 10/48; H01M 10/482
USPC ................ 324/222, 228–231, 234, 236–240, 324/242–243
See application file for complete search history.

(56) References Cited

U.S. PATENT DOCUMENTS

| | | | | |
|---|---|---|---|---|
| 2013/0305835 | A1* | 11/2013 | Jansky | ...................... G01N 3/08 73/818 |
| 2018/0100824 | A1* | 4/2018 | Asselin | ................... B07C 5/365 |

FOREIGN PATENT DOCUMENTS

| | | | |
|---|---|---|---|
| CN | 106950279 | A | 7/2017 |
| JP | H09-507294 | A | 7/1997 |
| JP | 409-274017 | A | 10/1997 |
| JP | 2004-017700 | A | 1/2004 |
| JP | 2006-153856 | A | 6/2006 |
| JP | 2006-319303 | A | 11/2006 |
| JP | 2009-008645 | A | 1/2009 |
| JP | 2009-252644 | A | 10/2009 |
| JP | 2009252644 | A * | 10/2009 |
| JP | 2012-122832 | A | 6/2012 |
| JP | 2012-159437 | A | 8/2012 |
| JP | 2013-251324 | A | 12/2013 |
| KR | 10-2009-0002368 | A | 1/2009 |
| KR | 10-2009-0031659 | A | 3/2009 |
| KR | 10-2013-0064853 | A | 6/2013 |
| KR | 10-2013-0089430 | A | 8/2013 |
| KR | 10-2014-0084607 | A | 7/2014 |
| KR | 10-2014-0137784 | A | 12/2014 |
| KR | 10-2015-0014024 | A | 2/2015 |
| KR | 20160064571 | A * | 6/2016 |
| KR | 10-1792573 | B1 | 11/2017 |
| KR | 10-2018-0092445 | A | 8/2018 |
| KR | 10-2023739 | B1 | 9/2019 |

OTHER PUBLICATIONS

Hiroki et al.; Translation of JP 2009252644; Pub. Date Mar. 12, 2014; EPO & Google (Year: 2014).*
Houng et al.; Translation of KR 20160064571; Pub. Date Jun. 8, 2016; EPO & Google (Year: 2016).*
International Search Report dated Jul. 2, 2020 issued in corresponding International Patent Application No. PCT/KR2020/004036.
Office Action dated Jun. 21, 2019, issued in corresponding Korean Patent Application No. 10-2019-0044954.
Notice of Allowance dated Sep. 3, 2019, issued in corresponding Korean Patent Application No. 10-2019-0044954.
Extended European Search Report dated Oct. 11, 2021 issued by the European Patent Office in corresponding European patent application No. 20790933.4.

* cited by examiner

INSPECTION METHOD FOR CRACK IN BATTERY CELL BY USING EDDY CURRENT, AND INSPECTION DEVICE

TECHNICAL FIELD

This application claims the benefit of priority based on Korean Patent Application No. 10-2019-0044954, filed on Apr. 17, 2019, and the entire contents of the Korean patent application are incorporated herein by reference.

The present invention relates to a method and apparatus for inspecting cracks inside a lithium secondary battery, and more particularly, to a method and apparatus for non-destructively detecting electrode cracks, tap cracks, and weld cracks using eddy currents.

BACKGROUND ART

As the price of energy sources increases due to depletion of fossil fuels and the interest in environmental pollution increases, the demand for environmentally friendly alternative energy sources becomes an indispensable factor for future life. Especially, as technology development and demand for mobile devices are increasing, demand for secondary batteries as energy sources is rapidly increasing.

Typically, in terms of the shape of the battery, there is a high demand for a prismatic secondary battery and a pouch-type secondary battery that can be applied to products such as mobile phones with a small thickness. In terms of materials, there is a high demand for lithium secondary batteries such as lithium ion batteries and lithium ion polymer batteries having high energy density, discharge voltage, and output stability.

The secondary battery is classified according to the structure of the positive electrode, the negative electrode, and the electrode assembly having the structure of a separator interposed between the positive electrode and the negative electrode. Some examples thereof include a jelly-roll type (wound type) electrode assembly in which positive electrodes and negative electrodes of a long sheet type are wound with a separator interposed therebetween, a stack-folding type electrode assembly of a structure in which unit cells, such as bi-cells or full cells, stacked with positive and negative electrodes of a predetermined unit laminated through a separator, are wound, etc.

In addition, the secondary battery is manufactured by injecting an electrolyte, which is a liquid electrolyte, in a state where the electrode assembly is accommodated in the battery container, and sealing the battery container.

During the manufacturing process of the above electrode or the assembly process of the electrode assembly, cracks may occur on the electrodes, tabs, and welds due to differences in elongation between a coated part and an uncoated part, physical external force due to welding, etc., and such cracks may cause low voltage defects.

The problem is that in the case of a stack-folding type battery cell, due to the characteristics of the stack-folding process, assembly defects occurring during the folding process cannot be easily found through vision inspection due to cracks inside the folding cell, and there is no method for non-destructively detecting cracks in the sealed battery cell after sealing is completed.

Accordingly, there is a need to develop a technology for a method and apparatus for non-destructively detecting cracks in a battery cell.

DISCLOSURE

Technical Problem

The present invention has been made to solve the above problems, and an object of the present invention is to provide an apparatus and method for non-destructively detecting cracks in a lithium secondary battery in which sealing has been completed.

Technical Solution

In order to solve the above problems, the present invention provides an apparatus for detecting a crack in a battery cell using an eddy current, the apparatus including:
- an inspection unit configured to include a first sensor for inducing an eddy current and a second sensor for sensing an eddy current signal induced by the first sensor, and perform inspection by the eddy current while the battery cell is moving;
- a transfer unit configured to sequentially transfer a plurality of battery cells from a point where the battery cells are input to a point where the battery cells are taken out; and
- a controller configured to be electrically connected to the inspection unit and receive, evaluate and control the eddy current signal sensed by the inspection unit.

In the present invention, the crack in the battery cell may mean a crack generated on an electrode, an electrode tab, and a weld.

In an embodiment of the present invention, the inspection unit may be designed to move the first sensor and the second sensor to a position to be inspected, and may perform inspection by an eddy current in a state where the first sensor and the second sensor are fixed.

In an embodiment of the present invention, the inspection unit may include: a first position adjustment member configured to be coupled to the first sensor on one side and be coupled to a third position adjustment member by a position fixing bolt on the other side;
- a second position adjustment member configured to be coupled to the second sensor on one side and be coupled to a third position adjustment member by a position fixing bolt on the other side;
- a third position adjustment member configured to be coupled to the first position adjustment member and the second position adjustment member, respectively, on one side and be coupled to a fourth position adjustment member by a position fixing bolt on the other side; and
- the fourth position adjustment member coupled to the third position adjustment member by the position fixing bolt.

Herein, portions, where the first position adjustment member and the second position adjustment member are coupled to the third position adjustment member, respectively, may be spaced apart at predetermined intervals on the same extension line.

Further, the third position adjustment member may have a sliding groove having a predetermined length for adjusting positions of the first position adjustment member and the second position adjustment member, and the first position adjustment member and the second position adjustment member may be movable along the sliding groove.

Further, the fourth position adjustment member may have a sliding groove having a predetermined length for adjusting a position of the third position adjustment member, and the third position adjustment member may be movable along the sliding groove.

In an embodiment of the present invention, the first sensor and the second sensor each may include a coil.

Herein, a diameter of the coil may be 0.5 to 10 mm.

In an embodiment of the present invention, the transfer unit may include: a transfer die configured to be extended from an input point to a discharge point of the battery cell; and a transfer means configured to transfer the battery cell.

In an embodiment of the present invention, the transfer unit may have a plurality of unit movement sections, and the transfer means may reciprocate at one or more unit movement sections.

In an embodiment of the present invention, the transfer die may include a nest in which a battery cell is seated between one unit movement section and its adjacent unit movement section, and a receiving groove recessed in the nest according to a shape of the battery cell may be formed.

In an embodiment of the present invention, the transfer means may include: a lifting unit configured to elevate the battery cell from the transfer die; and a driving unit configured to be coupled with the lifting unit to be movable and allow the lifting unit to be reciprocated in a horizontal direction.

In an embodiment of the present invention, the lifting unit may include a hole for adsorption of a battery cell, and vacuum may be applied through the adsorption hole to adsorb the battery cell.

In an embodiment of the present invention, the lifting unit may be a cylinder that reciprocates up and down by oil pressure or air pressure.

In an embodiment of the present invention, the battery cell may be a pouch type lithium secondary battery.

In an embodiment of the present invention, the battery cell may travel at a constant speed while the inspection unit performs eddy current inspection.

In an embodiment of the present invention, a traveling speed of the battery cell in an inspection area may be controlled differently from traveling speeds of other areas.

In an embodiment of the present invention, the eddy current signal is a voltage.

In an embodiment of the present invention, the apparatus may further include an optical sensor configured to transmit start and end time points of eddy current generation and detection to the first sensor and the second sensor.

Further, the optical sensor may detect both ends of the electrode lead, and transmits detection signals of the detected ends to the first sensor and the second sensor.

Further, the eddy current inspection may be started by detecting a detection signal at a first end, and the eddy current inspection may be finished by detecting a detection signal at a second end.

Advantageous Effects

Since the crack detection device inside the battery cell of the present invention uses the eddy current to detect the presence and location of cracks on the electrodes, electrode tabs, and welds, cracks in the battery cells can be detected in a non-destructive manner.

DETAILED DESCRIPTION OF THE PREFERRED EMBODIMENTS

The terms and words used in the present specification and claims should not be construed as limited to ordinary or dictionary terms and the inventor may properly define the concept of the terms in order to best describe its invention. The terms and words should be construed as meaning and concept consistent with the technical idea of the present invention. Accordingly, the embodiments described in the specification and the configurations described in the drawings are only the most preferred embodiments of the present invention, and do not represent all of the technical ideas of the present invention. It is to be understood that there may be various equivalents and variations in place of them at the time of filing the present application.

Also, throughout the specification, when an element is referred to as "including" an element, it is understood that the element may include other elements as well unless specifically stated otherwise.

As used throughout this specification, the terms "about", "substantially", and the like, are used to mean a value or something like this when unique manufacturing and material tolerances are presented, and the terms are used to prevent unscrupulous infringers from unfair use of the disclosure including accurate or absolute figures in order to aid in the understanding of the present disclosure.

Throughout this specification, the term "combination(s) thereof" included in the expression of the Markush form means one or more mixtures or combinations selected from the group consisting of the elements described in the Markush form representation, and it means to include one or more selected from the group consisting of the above components.

Throughout this specification, the expression "A and/or B" means "A or B or both."

Hereinafter, the present invention will be described in detail.

Figure 1:
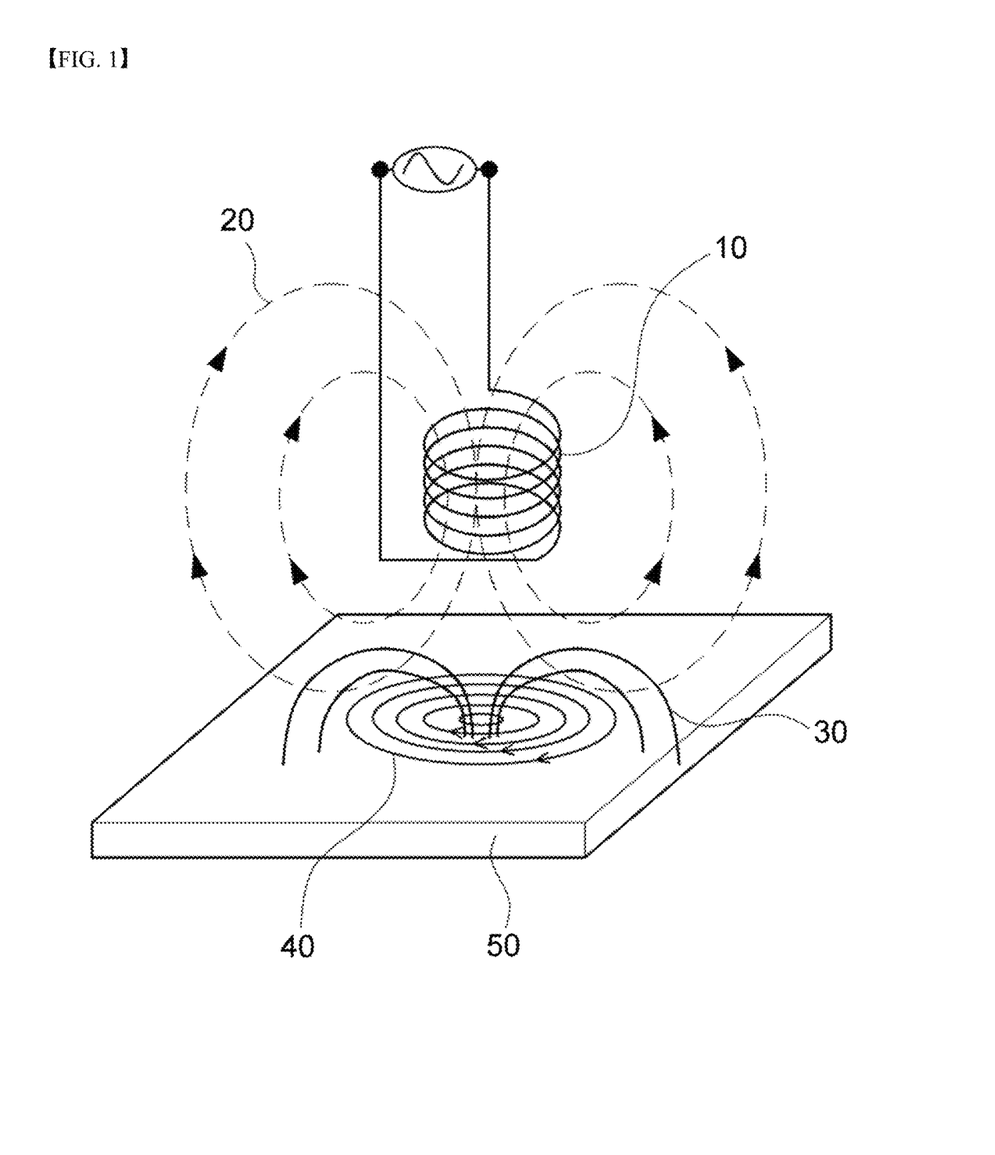
FIG. 1 is a schematic diagram showing the principle of detection of cracks using eddy currents.

FIG. 1 is a schematic diagram showing the principle of detection of cracks using eddy currents.

Referring to FIG. 1, when an alternating current is added to a coil 10, a primary magnetic field 20 is generated around the coil. At this time, when the coil 10 on which the primary magnetic field 20 is formed is brought to the surface of an inspection object 50, an induced electromotive force is generated in the surface of the inspection object 50 by electromagnetic induction. This induced electromotive force causes a current that interferes with the primary magnetic field 20 to flow, and this current is referred to as an eddy current 40.

The eddy current is changed according to changes in the state, position, defects, and materials of the surface of the inspection object 50. The present invention is to detect a crack in the battery cell, using the characteristics of this eddy current. That is, the battery cell to be inspected is passed between the eddy current sensors, the eddy current signal is measured, and when the eddy current signal is changed, it is regarded that the eddy current signal has been changed due to the crack of the electrode, electrode tab, or welding portions. In this way, a crack is detected.

Figure 2:
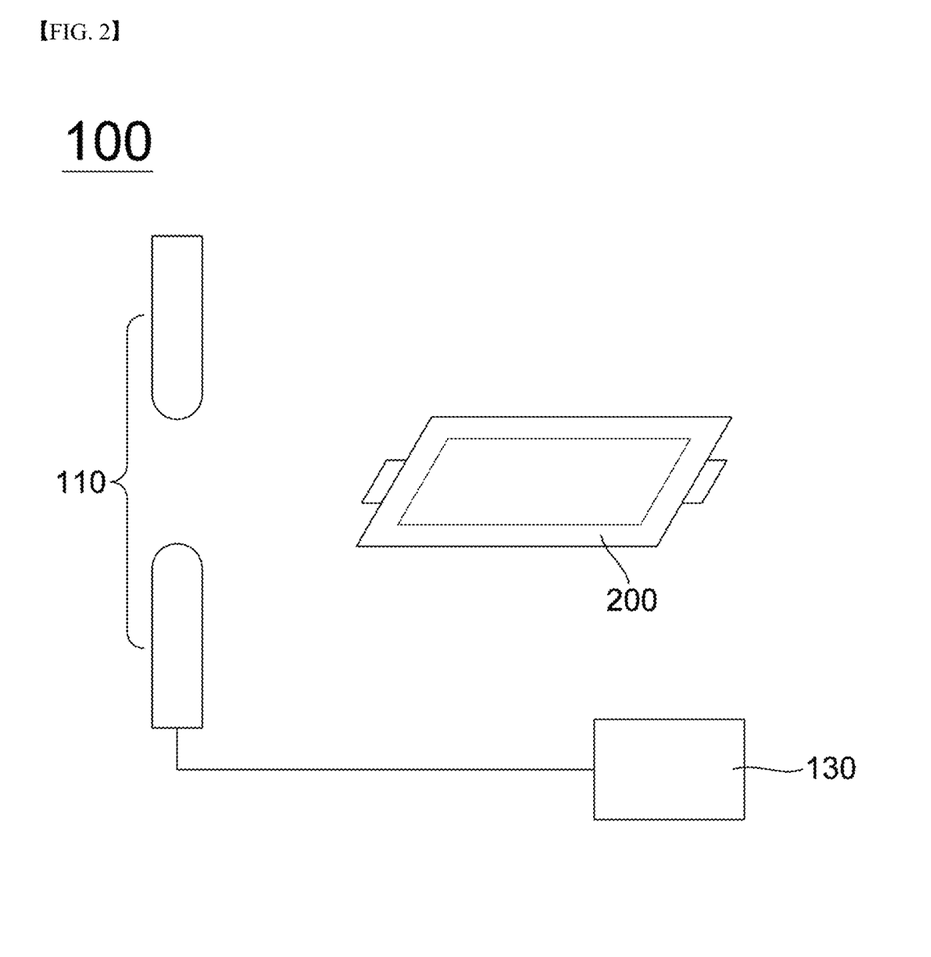
FIG. 2 is a schematic diagram of a crack detection device inside a battery cell according to an embodiment of the present invention.
Figure 5:
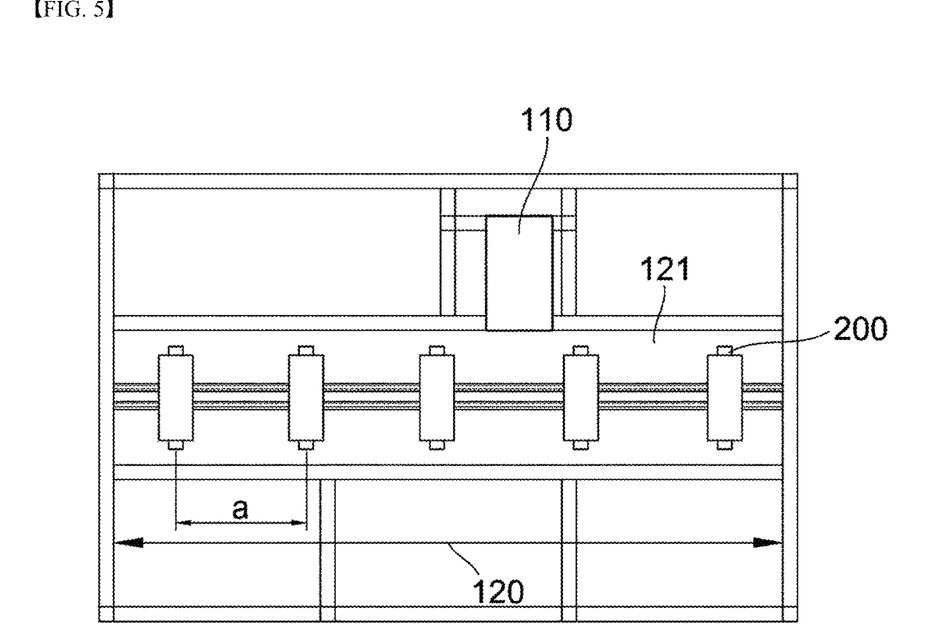
FIG. 5 is a detailed view of an inspection unit and a transfer unit according to an embodiment of the present invention.

FIG. 2 is a schematic diagram showing a crack detection device according to an embodiment of the present invention, and FIG. 5 is a detailed view of an inspection unit and a transfer unit according to an embodiment of the present invention. Referring to these drawings, a crack detection device of the present invention for detecting cracks in battery cells using eddy currents includes:

- an inspection unit 110 configured to include a first sensor for inducing an eddy current and a second sensor for sensing an eddy current signal induced by the first sensor, and perform inspection by the eddy current while the battery cell is moving;
- a transfer unit 120 configured to sequentially transfer a plurality of battery cells from a point where the battery cells are input to a point where the battery cells are taken out; and
- a controller 130 configured to be electrically connected to the inspection unit and receive, evaluate and control the eddy current signal sensed by the inspection unit.

In the present invention, the crack in the battery cell means a crack generated on an electrode, an electrode tab, and a welding portion.

A crack of the electrode can be explained as follows. After the electrode mixture containing the electrode active material, binder, conductive material, etc. is applied on the current collector, the electrode manufactured through an electrode process such as drying and rolling may have a crack, on the current collector, caused by a difference in elongation, etc. between the current collector and the electrode mixture during the electrode process. Such a crack may be called a crack of the electrode.

The crack of the electrode tab may be a crack generated due to the difference in elongation between a coated part and an uncoated part or a crack caused by vibration or external force during welding due to the accumulation of stress on the wrinkles at the boundary.

The crack on a welding portion may be a non-weld portion formed by insufficient welding during welding or a crack generated during a welding process.

Cracks generated on the electrodes, electrode tabs, and welds listed above cannot be observed from the outside of the battery case because the inside of the battery cell is covered by the battery case when the electrode assembly is sealed with a battery case such as a laminate sheet through a sealing process. However, if the crack detection device using the eddy current of the present invention is used, there is an effect capable of detecting the cracks.

Figure 3:
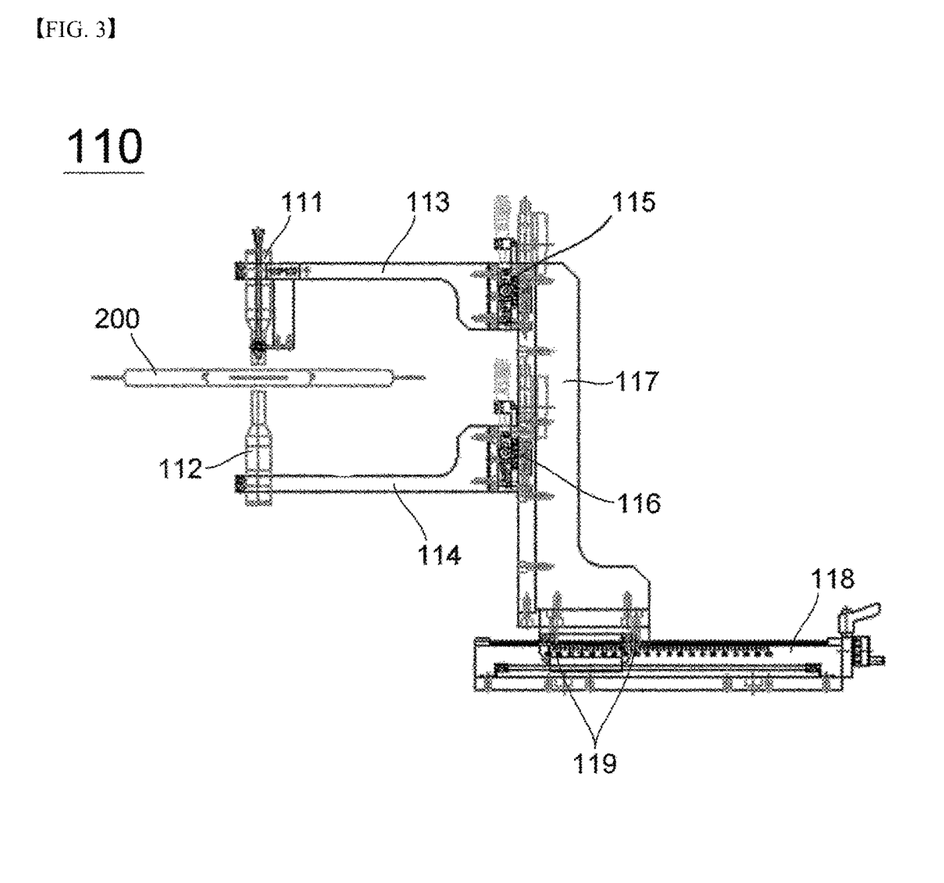
FIG. 3 is a detailed view of an inspection unit according to another embodiment of the present invention.

Hereinafter, the inspection unit will be described in detail. FIG. 3 is a view showing the structure of an inspection unit according to an embodiment of the present invention. Referring to FIG. 3, an inspection unit 110 of the present invention may be moved to a position to be inspected by the first sensor 111 and the second sensor 112 and is configured to perform induction of eddy currents and detection of eddy currents in a state that the first sensor 111 and the second sensor 112 are fixed.

Specifically, the inspection unit includes:
- a first sensor 111 configured to induce an eddy current;
- a second sensor 112 configured to sense an eddy current signal induced by the first sensor 111;
- a first position adjustment member 113 configured to be coupled to the first sensor 111 on one side and be coupled to a third position adjustment member 117 by a position fixing bolt 115 on the other side;
- a second position adjustment member 114 configured to be coupled to the second sensor 112 on one side and be coupled to the third position adjustment member 117 by a position fixing bolt 116 on the other side;
- a third position adjustment member 117 configured to be coupled to the first position adjustment member 113 and the second position adjustment member 114, respectively, on one side and be coupled to a fourth position adjustment member 118 by a position fixing bolt 119 on the other side; and
- the fourth position adjustment member 118 coupled to the third position adjustment member 117 by the position fixing bolt 119.

The parts where the first position adjustment member 113 and the second position adjustment member 114 are respectively coupled with the third position adjustment member 117 are spaced apart at predetermined intervals on the same extension line. The third position adjustment member 117 is provided with a sliding groove (not shown) having a predetermined length for adjusting the position of the first position adjustment member and the second position adjustment member. Further, the first position adjustment member and the second position adjustment member can move along the sliding groove.

Further, the fourth position adjustment member 118 is provided with a sliding groove having a predetermined length for adjusting the position of the third position adjustment member 117, and the third position adjustment member 117 may move along the sliding groove.

According to the above embodiment, in order to move the first sensor 111 and the second sensor 112 to a desired position by the operator, the first position adjustment member 113 and the second position adjustment member 114 combined with the first sensor 111 and the second sensor 112 are designed to move in the vertical direction, respectively. Here, the vertical direction may be defined as a direction away from and closer to the battery cell 200, which is the object to be inspected, in the vertical direction.

A sliding groove (not shown) for moving the first position adjustment member may be provided at a portion coupled with the first position adjustment member 113, on one side of the third position adjustment member 117. The first position adjustment member may be moved in the sliding groove within a length range of the sliding groove. The sliding groove has a shape extending in the vertical direction of the battery cell. The first position adjustment member 113 can be fixed to the third position adjustment member 117 by the manipulation of the position fixing bolt 115.

The second sensor 112, like the first sensor, is coupled to one side of the second position adjustment member 114 so that it can move in the vertical direction, and the other side of the second position adjustment member is designed to be combined with one side of the third position adjustment member 117. A sliding groove (not shown) for moving the second position adjustment member 114 may be provided at a portion coupled with the second position adjustment member, on one side of the third position adjustment member 117. The second position adjustment member can move along the sliding groove, and the second position adjustment member may be fixed to the third position adjustment member by the operation of the position fixing bolt 116. The portions, where the first position adjustment member 113 and the second position adjustment member 114 are coupled to the third position adjustment member 117, respectively, are spaced apart at predetermined intervals on the same extension line.

The third position adjustment member is coupled to the fourth position adjustment member, on the same principle that the first position adjustment member and the second position adjustment member are coupled to the third position adjustment member. The fourth position adjustment member may be provided with a sliding groove (not shown) through which the third position adjustment member can move, the third position adjustment member is movable within the length range of the sliding groove, and the user moves the third position adjustment member to the desired position through the sliding groove and then operates the position fixing bolt 119 to fix the third position adjustment member to the fourth position adjustment member.

Figure 4:
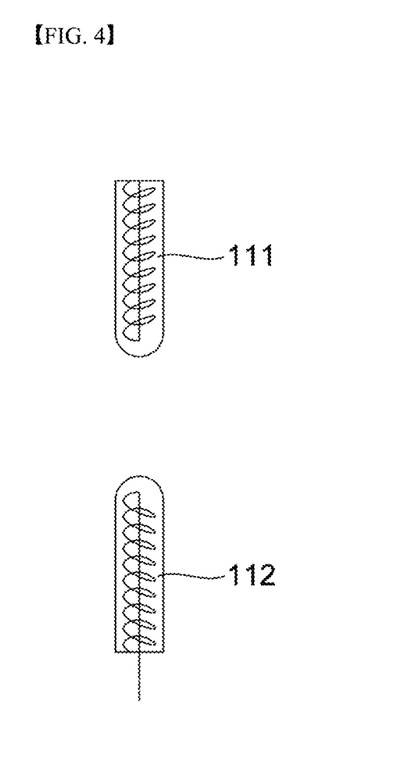
FIG. 4 is a schematic diagram of coils inside a first sensor and a second sensor constituting the inspection unit of FIG. 3.

FIG. 4 is a schematic view showing a first sensor and a second sensor. Referring to FIG. 4, the first sensor 111 and the second sensor 112 each include a coil.

In one embodiment of the present invention, the first sensor and the second sensor are formed in a structure in which a coil is wound on a magnetized member (not shown), and may have a case surrounding the coil. In addition, a cover is formed at one end of the case, and an open shape may be formed at the other end of the case. The case is used to protect the first sensor and the second sensor which use an eddy current from external impact and is used to allow the first sensor and the second sensor to be easily mounted on another location, such as a transfer unit or a position fixing member described later.

When an alternating current is applied to the coil of the first sensor 111, a primary magnetic field is formed around the coil. In this embodiment, the coil has a spring shape, but is not limited thereto. When the coil in which the primary magnetic field is formed is brought to the lithium secondary battery as an object to be inspected, an induced electromotive force is generated in the lithium secondary battery due to electromagnetic induction, and eddy currents interfering with the primary magnetic field flow. As such, the first sensor induces an eddy current in the lithium secondary battery.

The second sensor 112 is located on the opposite side of the first sensor 111 based on the battery cell as an object to be inspected. The second sensor functions to detect the eddy current signal induced by the first sensor. The second sensor detects attenuated eddy current signals, which are generated by attenuation such as formation, reflection, and absorption of the eddy current induced by the first sensor, due to factors such as state, position, defect, and material of the lithium secondary battery, which is the object to be inspected. Therefore, when there is a crack in the inside of the battery cell, a change in the eddy current signal occurs, and the second sensor detects the eddy current signal and transmits the eddy current signal to a controller described later.

In one preferred embodiment of the present invention, the diameter of the coil is 0.5 to 10 mm. Here, the diameter of the coil means a diameter on a horizontal cross section of the coil wound around the magnetic member or the magnetized member. If the diameter of the coil is less than 0.5 mm, the diameter is too small to detect the eddy current signal, and thus the detection of cracks inside the secondary battery may be difficult. Conversely, when the diameter of the coil exceeds 10 mm, noise adversely affects the detection of internal cracks, which is undesirable. Therefore, it is desirable to select the optimum coil diameter for detecting internal cracks while appropriately adjusting the diameter of the coil within the above numerical range.

In performing an inspection using eddy currents, the distance between the coil and the surface to be inspected is called lift-off. In order to improve the ability to detect defects on the surface to be inspected, it is desirable that the lift-off is kept constant or minimized.

Hereinafter, the transfer unit 120 will be described.

Figure 6:
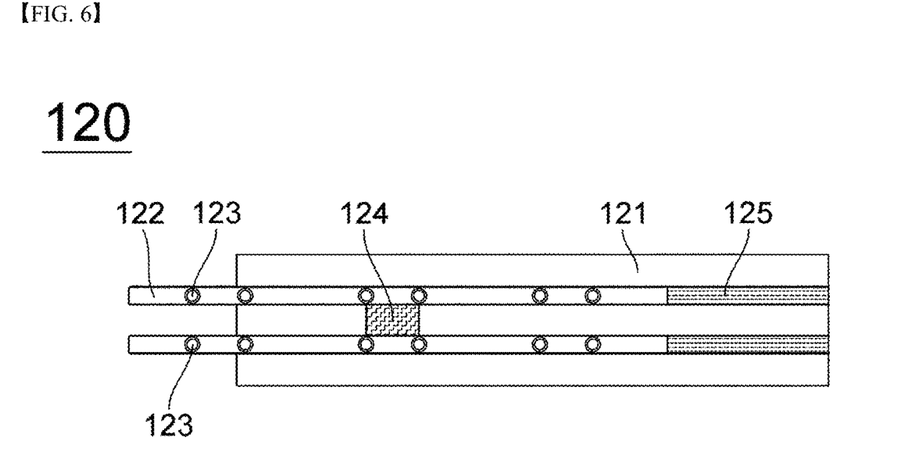
FIG. 6 is a schematic view showing the transfer unit of FIG. 5.

FIG. 5 is a view illustrating a crack inspection apparatus according to an embodiment of the present invention as viewed from the top and shows an inspection unit 110 and a transfer unit 120, and FIG. 6 is a detailed view of the transfer unit 120 of FIG. 5. Referring to these drawings, the transfer unit 120 includes: a transfer die 121 extending from an input point to an exit point of the battery cell; transfer means 122, 123 and 124 for transferring the battery cells.

The battery cell 200 inside the crack detection device of the present invention is transferred toward the inspection unit 110 by the transfer unit 120, and after the inspection by the inspection unit 110 is finished, the battery cell 200 is transported to an exit and taken out. The plurality of battery cells 200 are sequentially input to the transfer unit 120, and the battery cells are arranged and transferred at regular intervals.

The inspection unit 110 performs an inspection using an eddy current while the battery cell travels through the inspection area. During the inspection of the preceding battery cell, the following battery cell is transferred to the position where the preceding battery cell stayed. At this time, the following battery cell may have a predetermined waiting time for inspection, and when the inspection of the preceding battery cell is finished and leaves the inspection area, the following battery cell is transferred into the inspection area to start the inspection.

The inspection apparatus of the present invention can adjust the traveling speed of the battery cells in the inspection area differently from the transfer speed of the battery cells outside the inspection area, if necessary. That is, the traveling speed of the battery cell in the inspection area may be slower than the transfer speed of the battery cell in the area other than the inspection area.

Referring to FIGS. 3 and 5, in the internal crack detection device of the present invention, the first sensor and the second sensor are operated while the battery cell 200 to be inspected passes between the first sensor 111 and the second sensor 112, and eddy current inspection is performed in the state in which the battery cell 200 is interposed between the sensors 111 and 112. At this time, the battery cell is passed between the first sensor and the second sensor by the transfer means 122, 123 and 124 to be described later. And, while the eddy current inspection is performed by the first sensor and the second sensor, it is preferable that the battery cell travels in the inspection area at a constant speed.

Referring to FIG. 6 showing an embodiment of the transfer unit 120 of the present invention, the transfer unit 120 of the present invention may include the transfer die 121 and the transfer means 122, 123 and 124 for transferring the battery cells. And the transfer means may include: a lifting unit 122 for elevating the battery cell from the transfer die; and a driving unit 124 to which the lifting unit 122 is movably coupled and which transfers the lifting unit in the transfer direction of the battery cell. As long as the driving unit moves the lifting unit, various forms may be applied.

The lifting unit may be a cylinder that reciprocates up and down by oil pressure or air pressure. Hereinafter, an embodiment of the lifting unit will be described.

Referring to FIG. 6, the lifting unit 122 extends in a direction parallel to the traveling direction of the battery cell 200, and has a narrow and long bar shape, and two long bars are spaced apart above and below the center line parallel to the longitudinal direction (the traveling direction of the battery cell) of the transfer die. These cuboid-shaped lifting units support the battery cell 200 and move the battery cells while moving in the transfer direction of the battery cells together as the driving unit 124 moves.

In one embodiment of the present invention, the lifting unit may include at least one or more adsorption holes 123 for adsorption of the battery cells. The number of adsorption holes 123 can be appropriately adjusted as needed.

The lifting unit 122 adsorbs the battery cells to pick up the battery cells, and is extended from the driving unit 124 and is lifted for adsorption of the battery cells. In the driving unit 124, a surface opposite to a surface, on which the battery cell is mounted based on the transport die, may be installed on a lower surface of the transfer die 121. In order for the lifting unit to pass through the transfer die and rise to an upper part of the transfer die, the transfer die 121 may include an opening 125 at a portion corresponding to the lifting unit.

When the lifting unit extends from the driving unit and passes through the opening 125 of the transfer die and rises to the upper part of the transfer die, a vacuum is applied through the adsorption hole 123 so that the battery cell is adsorbed and fixed to the lifting unit.

As described above, as the lifting unit can adsorb the battery cell, the internal crack detection device of the present invention exhibits an effect that the alignment of the battery cells is not disturbed, the battery cells are removed from the lifting unit, or vibration of the battery cells can be suppressed. In the present invention for detecting the change in eddy current induction and eddy current signal while the battery cell is traveling, in order to improve inspection reliability, disturbance of battery cell alignment and battery cell vibration should be suppressed as much as possible while the battery cell is traveling. Since the crack detection device of the present invention is provided with an adsorption hole on the lifting unit, even when the battery cell is traveling during eddy current inspection, it has an effect of suppressing vibration, thereby improving reliability of inspection.

In an embodiment of the present invention, an embodiment of applying the vacuum through the adsorption hole in order to adsorb the battery cell by the lifting unit is illustrated. Herein, as long as the lifting unit can fix the battery cell, various forms can be applied without being limited to the above method.

In one embodiment of the present invention, the transfer unit may have a plurality of unit movement sections, and the transfer means may perform a reciprocating movement at one unit movement section or two or more unit movement sections. Therefore, the transfer unit may have a plurality of transfer means.

Referring to FIG. 5, the transfer unit has a plurality of unit movement sections (a). The transfer means picks up the battery cell placed at the start point of the unit movement section and transfers it to the start point of the adjacent unit movement section. The transfer means, which has completed the transfer of the battery cells in the unit movement section, returns to the starting point of the unit movement section again. The above process is repeated, and a plurality of battery cells are sequentially transferred.

Figure 7:
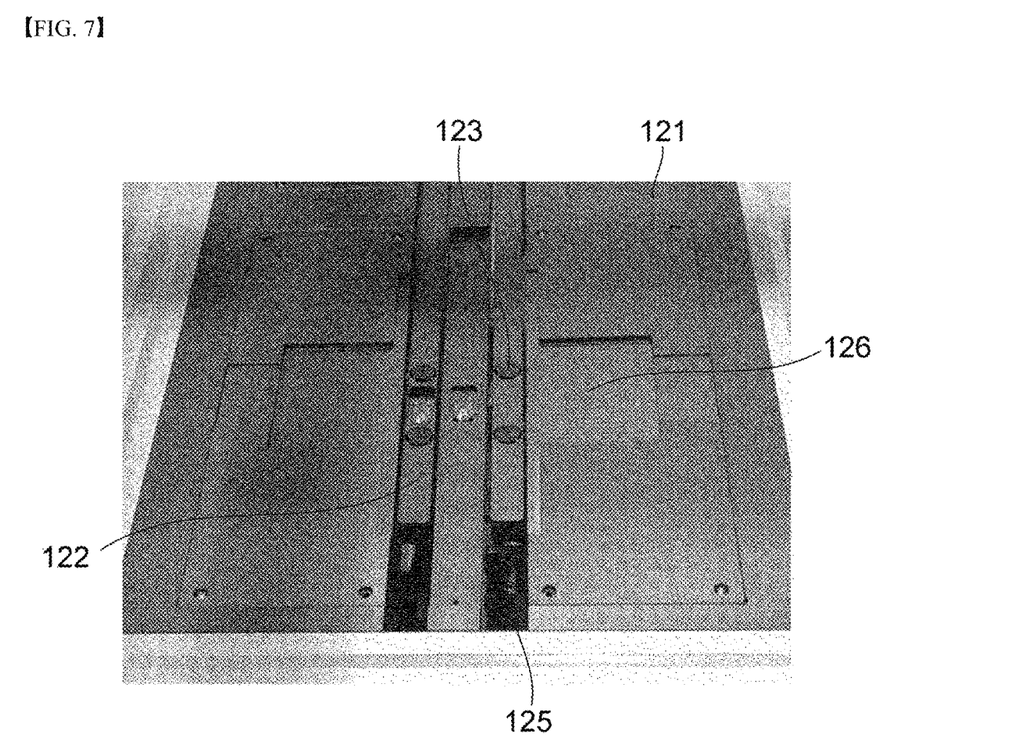
FIG. 7 is a schematic view showing a transfer die according to an embodiment of the present invention.

FIG. 7 shows a portion of the transfer die 121 according to an embodiment of the present invention, and referring to this, the transfer die 121 may include a nest 126 in which a battery cell is seated between one unit movement section and an adjacent unit movement section.

The nest 126 is formed with a receiving groove filled therein according to the shape of the battery cell, and the battery cell 200 is seated on the nest. As the battery cells are transferred from the input point to the inspection area, the alignment of the battery cells may be disturbed. In the crack detection device of the present invention, a nest is provided on the transfer die, so that the battery cells are aligned by being seated on the nest.

Referring to FIG. 7, the receiving grooves are respectively formed in a direction parallel to the traveling direction of the battery cell and a direction orthogonal to the traveling direction of the battery cell, thereby forming an appearance that a cross shape is embedded in the inside. This is for inspection in the longitudinal direction of the battery cell and in the width direction of the battery cell during inspection of the battery cell.

A process in which a battery cell 200 to be inspected is put into and taken out of the inspection apparatus of the present invention will be described in detail.

The transfer die constituting the transfer unit of the present invention is provided with a plurality of nests.

If a battery cell is put in a nest located at a battery cell input point, the lifting unit 122 extends from the driving unit 124 in the direction of the transfer die, and the lifting unit 122 rises through the opening 125 of the transfer die 121.

The lifting unit 122 rose to the upper part of the transfer die adsorbs and fixes the battery cell 200 seated on the nest. This is for minimizing separation of the battery cell from the transfer means, misalignment during the transfer, or movement of the battery cell during inspection. The method in which the lifting unit adsorbs the battery cell is not limited to the above-described embodiment as long as movement during the transfer of the battery cell can be minimized.

The lifting unit 122 is movably coupled to the driving unit 124, and a reciprocating movement is possible through the operation of the driving unit. The lifting unit 122 having adsorbed the battery cell maintains a raised state and moves toward the direction in which the inspection unit 110 has been installed through the operation of the driving unit. At this time, the battery cells that were supported or adsorbed by the lifting unit are also transferred.

The lifting unit transfers the adsorbed battery cell to an adjacent nest, and the lifting unit that completes the transfer to the adjacent nest releases the vacuum. The lifting unit that releases the vacuum is lowered again toward the driving unit installed at the bottom of the transfer die, and the driving unit returns to the original position together with the lifting unit. Thus, one battery cell is transferred from one unit movement section to an adjacent movement section. Then, this process is repeated sequentially, and the battery cell reaches the nest closest to the inspection unit 110 from the input point.

In one embodiment of the present invention, the internal crack inspection apparatus of the present invention may further include an alignment unit that aligns the battery cells seated in a nest closest to the inspection unit. By aligning the battery cells immediately before performing the eddy current inspection, the reliability of the inspection can be improved.

The battery cells aligned by the alignment unit are adsorbed to the lifting unit 122 again, travel through the inspection area, and undergo eddy current inspection by the first sensor and the second sensor.

In the inspection area by the inspection unit, it is preferable that the traveling speed of the battery cell is constant in order to increase the accuracy of inspection. In addition, the running speed while the battery cell passes through the inspection area may be controlled differently from the transfer speed of the battery cell in other areas.

The battery cell that has completed the eddy current inspection by the inspection unit is transferred to the point at which the battery cell is taken out by the transfer means including the lifting unit and the driving unit.

The controller 130 will be described in detail. The controller 130 constituting the crack detection device of the present invention is electrically connected to the inspection unit 110, receives and evaluates the eddy current signal sensed by the inspection unit, and functions to control the detection apparatus of the present invention.

The controller may receive and display information on the eddy current signal, and determine an internal crack by the displayed image.

In one embodiment of the present invention, the eddy current signal detected by the inspection unit may be a voltage, and if there is a crack inside the battery cell, the cracked part has a voltage change. Hence, whether there is a crack and the position of such a crack can be detected based thereon.

The controller receives the voltage sensed by the inspection unit, records the voltage, and detects the presence and location of cracks from the profile of the voltage value according to the detected position.

The controller may control the inspection unit and the transfer means. The controller may be configured as a conventional programmable electronic computer coupled with a memory for controlling the transfer and the speed of a plurality of battery cells.

The crack detection device of the present invention is to determine a crack based on a change in the eddy current signal, and is useful when detecting an internal crack in a pouch type lithium secondary battery.

Hereinafter, the pouch type lithium secondary battery of the present invention will be described in detail.

Generally, lithium secondary batteries can be classified according to the structure of the electrode assembly having a positive electrode/separator/negative electrode structure. Representative examples thereof include a jelly-roll (wound) electrode assembly in which long sheet type positive electrodes and negative electrodes are wound with a separator interposed therebetween, a stacked electrode assembly in which a plurality of positive and negative electrodes cut in a predetermined size unit are sequentially stacked with a separator interposed therebetween, and a stacked/foldable electrode assembly in which bi-cells or full cells, in which positive and negative electrodes of a predetermined unit are stacked with a separator interposed therebetween, are wound.

In recent years, a pouch type battery having a stack type or stack/folding type electrode assembly embedded in a pouch-shaped battery case of an aluminum laminate sheet has attracted a lot of attention due to its low manufacturing cost and small weight, and the amount used thereof is gradually increasing.

The pouch-type lithium secondary battery includes an electrode assembly, electrode tabs extending from the electrode assembly, electrode leads welded to the electrode tabs, and a battery case accommodating the electrode assembly.

The electrode assembly is a power generation device in which a positive electrode and a negative electrode are sequentially stacked with a separator interposed therebetween. The electrode assembly 130 has a stack-type structure or a stack/folding-type structure. The electrode tabs extend from each electrode plate of the electrode assembly, and the electrode leads are electrically connected to a plurality of electrode tabs extending from each electrode plate, for example by welding, and a part of the electrode lead is exposed outside of the battery case. An insulating film is attached to a portion of the upper and lower surfaces of the electrode leads in order to increase the degree of sealing with the battery case and to secure an electrically insulated state.

The battery case is typically made of an aluminum laminate sheet, provides a space for accommodating the electrode assembly, and has a pouch shape as a whole. In the case of the stacked electrode assembly, the upper end of the inside of the battery case is spaced from the electrode assembly so that a plurality of positive electrode tabs and a plurality of negative electrode tabs can be combined together with the electrode lead.

Since the pouch-type lithium secondary battery has an electrode, an electrode tab, and a welding portion inside the battery case as described above, it is difficult to detect a crack from the outside, but if a detection device using eddy current is used as in the present invention, cracks in the pouch type secondary battery can be detected.

The crack detection device according to another embodiment of the present invention may further include an optical sensor that transmits an induction time of the eddy current and an end time of the detection of the eddy current signal to the inspection unit.

Specifically, when the optical sensor detects the first end among two ends of the electrode lead and transmits a detection signal to the inspection unit, the first sensor and the second sensor of the inspection unit operate to start induction of eddy currents and detection of eddy current signals. When the optical sensor detects the second end among two ends of the electrode lead and transmits a detection signal to the inspection unit, the operation of the first sensor and the second sensor of the inspection unit is terminated. As described above, by limiting the start and end time of the eddy current inspection by the inspection unit to the area of the electrode lead, the inspection range is reduced to an area included in the length of the electrode lead, thereby improving detection sensitivity.

As described above, the electrode leads are electrically connected to each other by welding with a plurality of electrode tabs extending from each electrode plate, and since the electrode leads are drawn out of the battery case, the ends of the electrode leads can be recognized by an optical sensor.

The electrode lead includes a first end on one side and a second end on the other side, and the optical sensor moves from the first end to the second end and senses the first end and the second end. Specifically, the optical sensor recognizes the first end of one side of the electrode lead, and transmits the recognition signal to the first sensor. When the first sensor receives the recognition signal from the optical sensor, it applies current to the eddy current coil and ultimately starts eddy current induction into the lithium secondary battery. The optical sensor detects the second end while moving from the first end toward the second end, and transmits a recognition signal to the second sensor when the second end is recognized. When the second sensor receives the recognition signal from the optical sensor, the second sensor ends receiving the eddy current signal.

The present invention has been described with reference to the embodiments shown in the drawings, but this is only exemplary, and those of ordinary skill in the art to which the art pertains will appreciate that various modifications and other equivalent embodiments are possible. Therefore, the true technical protection scope of the present invention should be defined by the claims.

DESCRIPTION OF REFERENCE NUMERALS

100: crack detection device inside secondary battery
110: inspection unit
111: first sensor
112: second sensor
113: first position adjustment member
114: second position adjustment member
115, 116, 119: position fixing bolt
117: third position adjustment member
118: fourth position adjustment member
120: transfer unit
121: transfer die
122: lifting unit
123: adsorption hole
124: driving unit
125: opening
126: nest
a: unit movement section
130: controller
200: battery cell

The invention claimed is:

1. An apparatus for detecting a crack inside a battery cell using an eddy current, the apparatus comprising:
an inspection unit including: a first sensor inducing the eddy current; and a second sensor sensing a signal of the eddy current induced by the first sensor and performing an inspection of the battery cell using the eddy current while the battery cell is moving;
a transfer unit which sequentially transfers a plurality of battery cells from a point where the battery cells are input to a point where the battery cells are taken out; and
a controller electrically connected to the inspection unit and receiving and evaluating the signal of the eddy current sensed by the inspection unit, and controlling the inspection unit and the transfer unit,
wherein the inspection unit is designed to move the first sensor and the second sensor to a position where the battery cell is inspected, and performs the inspection using the eddy current in a state where the first sensor and the second sensor are fixed, wherein the inspection unit comprises:
a first position adjustment member coupled to the first sensor on one side and coupled to a third position adjustment member by a first position fixing bolt on the other side;
a second position adjustment member coupled to the second sensor on one side and coupled to the third position adjustment member by a second position fixing bolt on the other side;
the third position adjustment member coupled to the first position adjustment member and the second position adjustment member, respectively, on one side and coupled to a fourth position adjustment member by a third position fixing bolt on the other side; and
the fourth position adjustment member coupled to the third position adjustment member by the third position fixing bolt,
wherein portions, where the first position adjustment member and the second position adjustment member are coupled to the third position adjustment member, respectively, are spaced apart at predetermined intervals on the same extension line,
wherein the third position adjustment member has a sliding groove having a predetermined length for adjusting positions of the first position adjustment member and the second position adjustment member, and the first position adjustment member and the second position adjustment member are movable along the sliding groove, and
wherein the fourth position adjustment member has a sliding groove having a predetermined length for adjusting a position of the third position adjustment member, and the third position adjustment member is movable along the sliding groove.

2. The apparatus of claim 1, wherein the first sensor and the second sensor each include a coil.

3. The apparatus of claim 2, wherein a diameter of the coil is 0.5 to 10 mm.

4. The apparatus of claim 1, wherein the transfer unit comprises:
a transfer die extended from an input point to a discharge point of the battery cell; and
a transfer means which transfers the battery cell.

5. The apparatus of claim 4, wherein the transfer unit has a plurality of unit movement sections, and
wherein the transfer means reciprocates at one or more unit movement sections.

6. The apparatus of claim 5, wherein the transfer die includes a nest in which a battery cell is seated between one unit movement section and its adjacent unit movement section, and
wherein the transfer die further includes a receiving groove recessed in the nest according to a shape of the battery cell.

7. The apparatus of claim 4, wherein the transfer means comprises:
a lifting unit elevating the battery cell from the transfer die; and
a driving unit coupled with the lifting unit to be movable and allow the lifting unit to be reciprocated in a horizontal direction.

8. The apparatus of claim 7, wherein the lifting unit includes a hole for adsorption of a battery cell, and
wherein vacuum is applied through the adsorption hole to adsorb the battery cell.

9. The apparatus of claim 7, wherein the lifting unit is a cylinder that is reciprocated up and down by oil pressure or air pressure.

10. The apparatus of claim 1, wherein the battery cell travels at a constant speed while the inspection unit performs the inspection.

11. The apparatus of claim 1, wherein a traveling speed of the battery cell in an inspection area is controlled differently from traveling speeds of other areas.

12. The apparatus of claim 1, wherein the signal of the eddy current is a voltage.

13. An apparatus for detecting a crack inside a battery cell using an eddy current, the apparatus comprising:
an inspection unit including: a first sensor inducing the eddy current; and a second sensor sensing a signal of the eddy current induced by the first sensor and performing an inspection of the battery cell using the eddy current while the battery cell is moving;
a transfer unit which sequentially transfers a plurality of battery cells from a point where the battery cells are input to a point where the battery cells are taken out;
a controller electrically connected to the inspection unit and receiving and evaluating the signal of the eddy current sensed by the inspection unit, and controlling the inspection unit and the transfer unit, and an optical sensor transmitting start and end time points of the eddy current to the first sensor and the second sensor, wherein the optical sensor detects both first and second ends of an electrode lead, transfers the detected ends to the first sensor and the second sensor, and wherein the eddy current inspection is started as a detection signal at the first end, and the eddy current inspection is finished as a detection signal at the second end.

* * * * *